(12) United States Patent
Zywot et al.

(10) Patent No.: US 11,155,357 B2
(45) Date of Patent: Oct. 26, 2021

(54) GENERATOR WITH JET PUMP HAVING MOTIVE FLUID FOR FLUIDLY COUPLING TO A COOLING CIRCUIT

(71) Applicant: GE AVIATION SYSTEMS LLC, Grand Rapids, MI (US)

(72) Inventors: Jan Zywot, Centerville, OH (US); Gerard Howard Bueche, Byron, IL (US); Gary Michael Chessare, Caledonia, IL (US); Robert Donald Grennan, Byron, IL (US); Michael George Schneider, Rockford, IL (US)

(73) Assignee: GE Aviation Systems LLC, Grand Rapids, MI (US)

( * ) Notice: Subject to any disclaimer, the term of this patent is extended or adjusted under 35 U.S.C. 154(b) by 295 days.

(21) Appl. No.: 16/239,205

(22) Filed: Jan. 3, 2019

(65) Prior Publication Data
US 2020/0216186 A1    Jul. 9, 2020

(51) Int. Cl.
| | |
|---|---|
| *B64D 33/08* | (2006.01) |
| *B64D 27/10* | (2006.01) |
| *F01D 25/12* | (2006.01) |
| *H02K 7/116* | (2006.01) |
| *H02K 7/18* | (2006.01) |
| *H02K 9/193* | (2006.01) |
| *H02K 9/26* | (2006.01) |

(Continued)

(52) U.S. Cl.
CPC ............. *B64D 33/08* (2013.01); *B64D 27/10* (2013.01); *F01D 25/12* (2013.01); *H02K 7/116* (2013.01); *H02K 7/1823* (2013.01); *H02K 9/193* (2013.01); *H02K 9/26* (2013.01); *F01D 15/10* (2013.01); *F02C 7/32* (2013.01)

(58) Field of Classification Search
CPC ......... B64D 27/10; B64D 33/08; F01D 15/10; F01D 25/12; F02C 7/32; H02K 7/116; H02K 7/1823; H02K 9/193; H02K 9/26
USPC ......................................... 310/52, 54, 58, 64
See application file for complete search history.

(56) References Cited

U.S. PATENT DOCUMENTS

| 3,816,751 A | 6/1974 | Jampen et al. |
| 3,940,029 A * | 2/1976 | Horvath ................ B05B 9/0883 |
| | | 222/340 |

(Continued)

FOREIGN PATENT DOCUMENTS

| CN | 106505797 A | 3/2017 |
| EP | 3406525 A1 | 11/2018 |
| GB | 687550 A | 2/1953 |

OTHER PUBLICATIONS

European Patent Office, Extended Search Report re Corresponding Application No. 19219182.3-1004, dated May 14, 2020, 8 pages, Munich, Germany.

*Primary Examiner* — Tulsidas C Patel
*Assistant Examiner* — Rashad H Johnson
(74) *Attorney, Agent, or Firm* — McGarry Bair PC

(57) ABSTRACT

An apparatus and method relating to a generator comprising a housing defining an interior and fluidly separating the interior from surrounding ambient air, at least one of a rotor or stator located within the housing, a cooling circuit passing through at least a portion of the housing to cool the interior and recirculating a coolant having a density greater than the ambient air, and a jet pump having a motive fluid conduit fluidly coupled to the cooling circuit, a transport fluid circuit fluidly coupled to the ambient air.

29 Claims, 8 Drawing Sheets

(51) Int. Cl.
*F01D 15/10* (2006.01)
*F02C 7/32* (2006.01)

(56) References Cited

U.S. PATENT DOCUMENTS

| | | | | |
|---|---|---|---|---|
| 4,647,805 A | * | 3/1987 | Flygare | H02K 9/193 |
| | | | | 310/53 |
| 4,683,389 A | | 7/1987 | Readman et al. | |
| 4,962,829 A | * | 10/1990 | Sugden | F01M 11/06 |
| | | | | 184/27.2 |
| 6,210,123 B1 | * | 4/2001 | Wittrisch | F04F 5/466 |
| | | | | 417/194 |
| 6,578,351 B1 | | 6/2003 | Modafferi | |
| 7,540,142 B2 | | 6/2009 | Sheoran et al. | |
| 8,622,715 B1 | * | 1/2014 | Lott | F04F 5/463 |
| | | | | 417/198 |
| 8,783,027 B2 | | 7/2014 | Snuttjer | |
| 2005/0285458 A1 | | 12/2005 | Moeleker et al. | |
| 2007/0084434 A1 | * | 4/2007 | Leon | F01C 1/3566 |
| | | | | 123/241 |
| 2014/0077507 A1 | | 3/2014 | Barnett et al. | |
| 2017/0275004 A1 | * | 9/2017 | Bammann | B64D 13/04 |

\* cited by examiner

GENERATOR WITH JET PUMP HAVING MOTIVE FLUID FOR FLUIDLY COUPLING TO A COOLING CIRCUIT

BACKGROUND

Aircraft operate in constant pressure changing conditions. Due to high altitude operation, operating parts of the aircraft may require air pressurization systems to maintain constant pressure for proper operation. Generators and gearboxes are two mechanisms requiring a pressurization system. Due to the high altitude operation of the aircraft, an air pressurization system is required to maintain a working air pressure for the generator or gearbox.

Air pressurization systems can utilize a rotating air pump to continuously provide air pressure to the generator internal cavity and oil cooling system. Due to a continuous air supply to the generator/gearbox, air pressure control valves are continuously opening and closing to maintain constant generator air pressure in reference to the ambient pressure. This continuous operation of the pump and air pressure control system can cause premature wear of moving components and introduce inefficiencies to the generator or gearbox.

BRIEF DESCRIPTION

In one aspect, the disclosure herein relates to a generator comprising a housing defining an interior and fluidly separating the interior from surrounding ambient air, at least one of a rotor or stator located within the housing, a cooling circuit passing through at least a portion of the housing to cool the interior and recirculating a coolant having a density greater than the ambient air. Further comprising a jet pump having a motive fluid conduit fluidly coupled to the cooling circuit, a transport fluid circuit fluidly coupled to the ambient air, and a mixing chamber fluidly connecting the motive fluid conduit and the transport fluid circuit to form a mixed flow within the mixing chamber, with the mixing chamber having a chamber outlet to the interior.

In another aspect, the disclosure herein relates to an air pressurization system comprising a housing defining an interior, including a sump for collecting a motive fluid, and fluidly separating the interior from an exterior of surrounding ambient air, a transport fluid circuit for transporting an ambient airflow extending between an inlet fluidly coupled to the exterior and an outlet fluidly coupled to the interior, a cooling circuit fluidly coupled to the housing at the sump for recirculating the motive fluid. Further comprising a jet pump fluidly coupling the transport fluid circuit and the cooling circuit and comprising a mixing chamber for mixing the motive fluid and the ambient air to produce a pressurized mixture of air and motive fluid that is released into the interior via the outlet.

In yet another aspect, the disclosure herein relates to a method of maintaining a predetermined pressure within a housing defining an interior and fluidly separating the interior from an ambient air, the method comprising receiving an ambient airflow within a jet pump mixing chamber, receiving a motive fluid flow having a higher density that the ambient airflow within a jet pump mixing chamber, mixing the ambient airflow with the motive fluid flow to transfer momentum from the motive fluid to the ambient airflow, and discharging the ambient airflow into the interior to form a pressurized interior.

DETAILED DESCRIPTION

Figure 1:
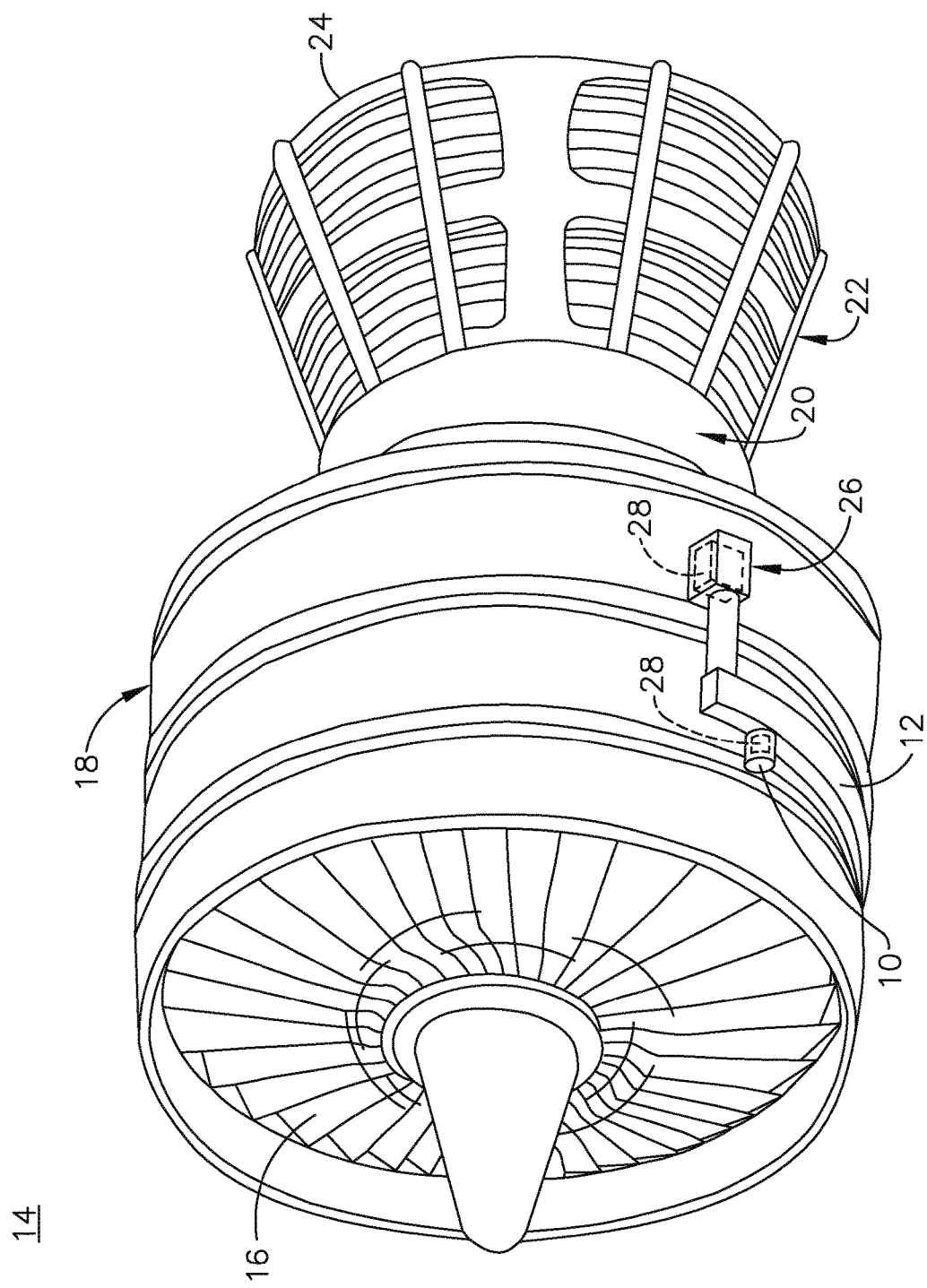
FIG. 1 is a schematic isometric view of a turbine engine with an accessory gear box, starter/generator, a mechanical power take-off.

The present disclosure is related to an air pressurization system to develop and maintain internal air pressure of a housing throughout the operational atmospheric pressure range of an aircraft. The housing can be that of a generator or gearbox, or any mechanism requiring a pressure controlled environment. Aircraft can operate between below sea level ambient pressures to high altitude ambient pressures. One non-limiting example of a mechanism requiring an air pressurization system is a generator. While the examples described herein are directed to application of a turbine engine and a generator for the turbine engine, the disclosure can be applied to any implementation of an air pressurization system.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto can vary.

As used herein, the term "forward" or "upstream" refers to moving in a direction toward the engine inlet, or a component being relatively closer to the engine inlet as compared to another component. The term "aft" or "downstream" refers to a direction toward the rear or outlet of the engine relative to the engine centerline. Additionally, as used herein, the terms "radial" or "radially" refer to a dimension extending between a center longitudinal axis of the engine and an outer engine circumference. It should be further understood that "a set" can include any number of the respectively described elements, including only one element.

Referring to FIG. 1, a generator 10 is coupled to an accessory gear box (AGB) 12, also known as a transmission housing, and together are schematically illustrated as being mounted to a turbine engine 14 such as a gas turbine engine. This assembly is commonly referred to as an Integrated Starter/Generator Gearbox (ISGB). While illustrated as a generator 10, it should be understood that the generator can be a starter, or a power generator, or a generator of any type such as a mechanical power take-off unit. The turbine engine 14 comprises an air intake with a fan 16 that supplies air to a high pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the turbine engine 14. As the pressurized gases pass through the high pressure turbine (not shown) of the high pressure turbine region 22 and the low pressure turbine (not shown) of the low pressure turbine region 24, the turbines extract rotational energy from the flow of the gases passing through the turbine engine 14. The high pressure turbine of the high pressure turbine region 22 can be coupled to the compression mechanism (not shown) of the high pressure compression region 18 by way of a shaft to power the compression mechanism. The low pressure turbine can be coupled to the fan 16 of the air intake by way of a shaft to power the fan 16.

The turbine engine can be a turbofan engine, or it could be a variety of other known turbine engines such as a turboprop or turboshaft. The turbine engine can also have an afterburner that burns an additional amount of fuel downstream of the low pressure turbine region 24 to increase the velocity of the exhausted gases, and thereby increasing thrust.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14. Under normal operating conditions, the power take-off 26 translates power from the turbine engine 14 to the AGB 12 to power accessories of the aircraft for example but not limited to fuel pumps, electrical systems, and cabin environment controls. The generator 10 can be mounted on the outside of either the air intake region containing the fan 16 or on the core near the high pressure compression region 18.

The generator 10 and the mechanical power take-off 26 can include housings 28 for any known power generator including by way of non-limiting example synchronous or asynchronous generators, permanent magnet generators, low pole count generators, etc.

Figure 2:
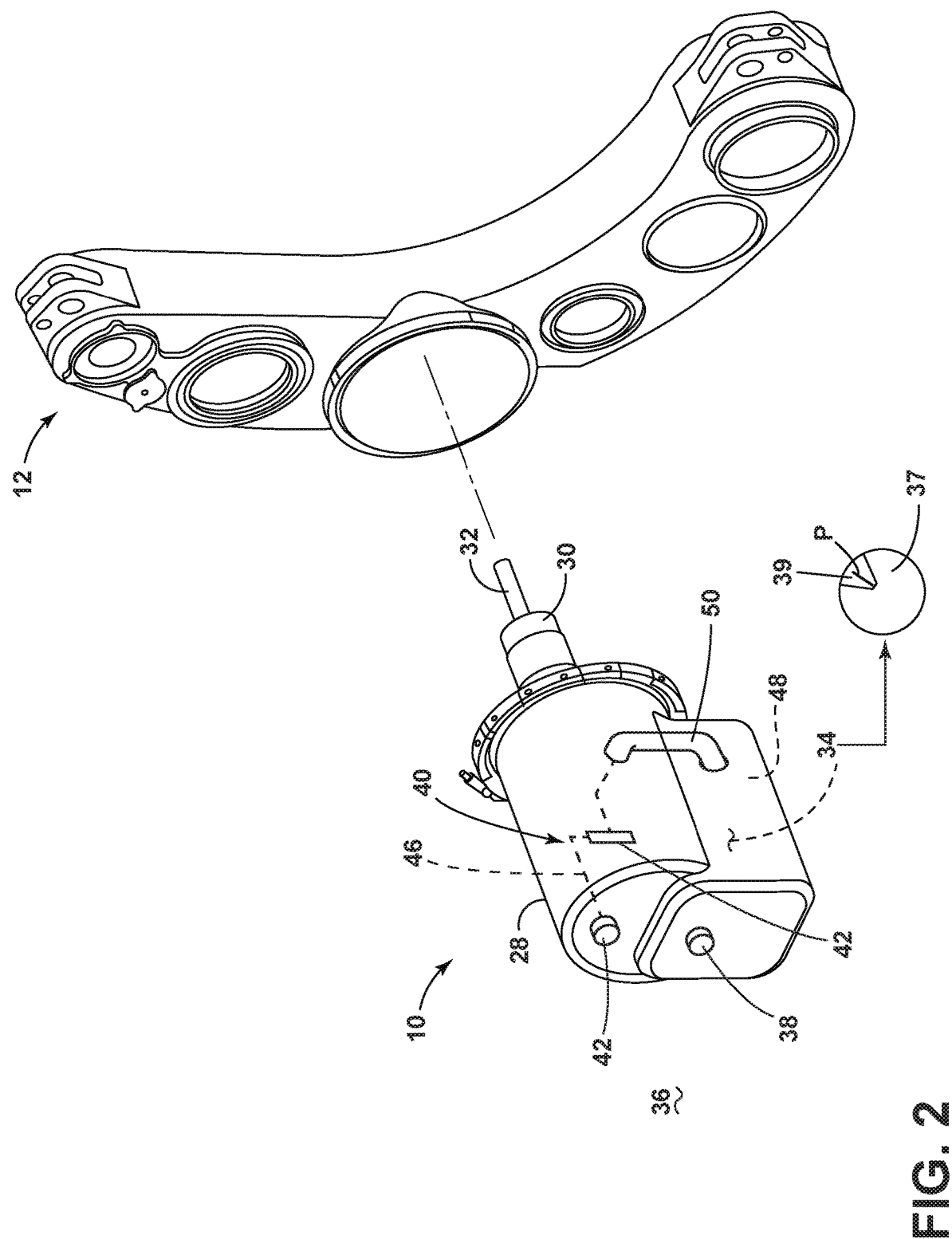
FIG. 2 is an enlarged exploded perspective view of the generator and an accessory gear box for the turbine engine of FIG. 1.

Referring now to FIG. 2, the generator 10 and the AGB 12 are depicted in perspective view. The AGB 12 and the generator 10 can be formed by any known materials and methods, including, but not limited to, die-casting of high strength and lightweight metals such as aluminum, stainless steel, iron, or titanium or additive manufacturing. The housings for the AGB 12 and generator 10 can be formed with a thickness sufficient to provide adequate mechanical rigidity without adding unnecessary weight to AGB 12 and the electric generator 10 and, therefore, the aircraft.

While illustrated as an electric generator the generator 10 can be any generator know in the art. The generator 10 can operate as a generator to provide power for accessories attached to the AGB 12 for example but not limited to a fuel pump, oil pump, or a separate engine starter. It is also contemplated that the generator 10 can operate as a motor supplying mechanical output where necessary, for example but not limited to supplying mechanical output torque sufficient to start the engine.

The generator 10 can include an output shaft 30 an input shaft 32 that can extend from within the output shaft 30 and is operably coupled to a portion of the AGB 12.

The housing 28 defines an interior 34 of the generator 10 fluidly separated from an exterior 36 of surrounding ambient air by the housing 28. In a non-limiting example, the exterior 36 can have a pressure associated with between 9,000 m (30,000 ft) and 22,000 m (70,000 ft) altitude. The interior 34 should maintain a predetermined pressure (P) based on a positive pressure differential between 11 psid and 15 psid respect to an outside atmospheric pressure of the exterior 36. An exemplary pressure gauge 37 is illustrated to show the predetermined pressure (P) along with a range 39 between which the predetermined pressure (P) can vary. An air pressure relief valve (APRV) 38 can be mounted to or otherwise integral with the housing 28 in order to provide pressure relief for the interior 34 in the event an over pressurization occurs within the housing 28. The APRV 38 can fluidly couple the interior 34 to the exterior 36. The APRV 38 can have a predetermined cracking pressure based on 17 psid. The APRV cracking pressure is set higher than the predetermined pressure (P) to account for valve hysteresis. It should be understood that the range and specific pressures indicated are for illustrative purposes only and not meant to be limiting. Pressures in differing applications depend on the pressure level required, air leakage, altitude, and valve performance.

An air pressurization system 40 can be located within the housing 28. The air pressurization system 40 includes a transport fluid circuit 46. The transport fluid circuit 46 extends between an inlet 42 fluidly coupled to the exterior 36 and a jet pump 44 disposed within the interior 34. The housing 28 can further include a sump 48 for collecting a motive fluid 47. A motive fluid conduit 50 can extend between the sump 48 and the jet pump 44.

Figure 3:
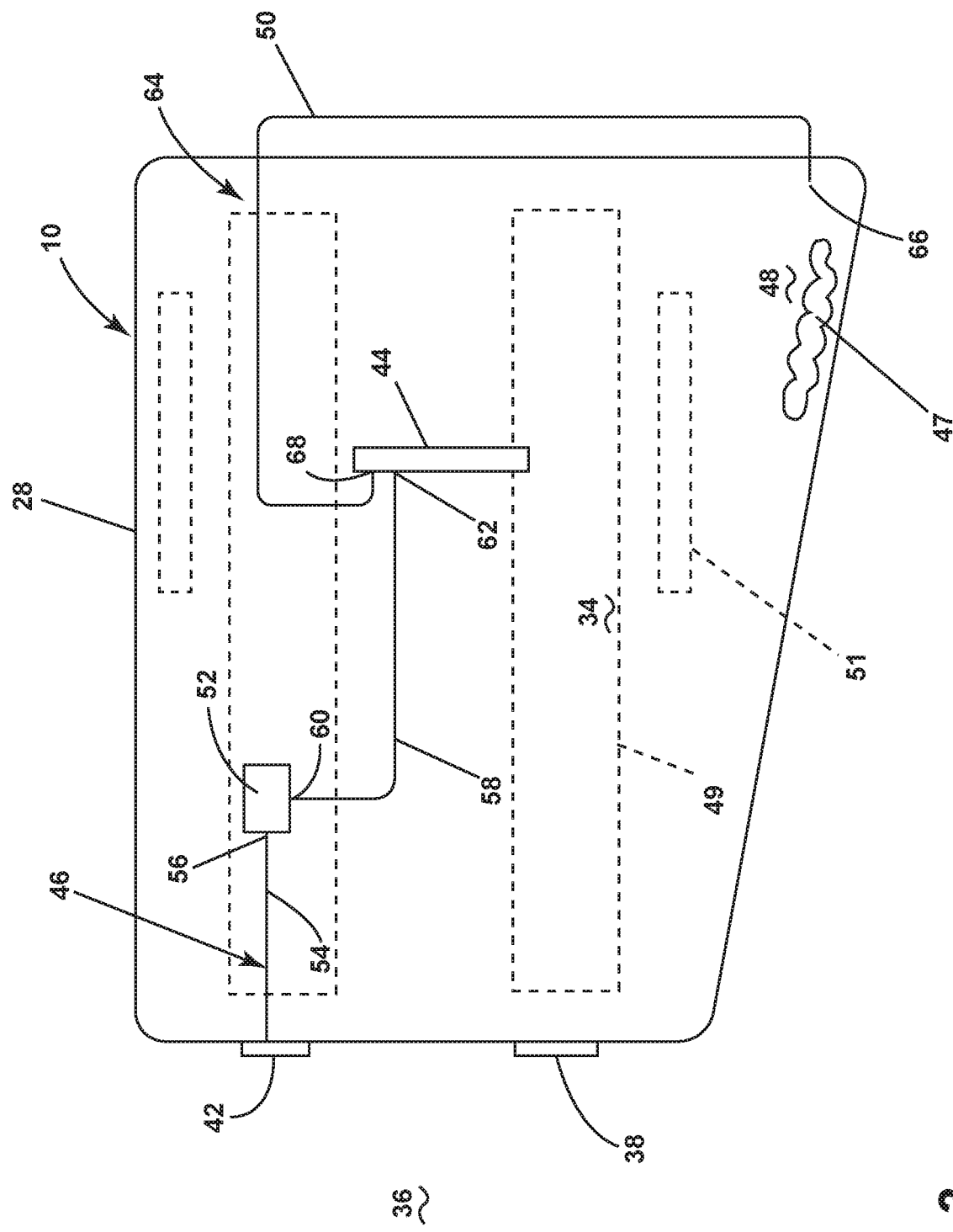
FIG. 3 is a schematic cross-sectional view of a housing for the generator with an air pressurization system including a jet pump and an air shut-off valve.

Turning to FIG. 3 a schematic cross-sectional view of the generator 10 is illustrated. A rotor 49 and a stator 51 are illustrated in phantom, while it should be understood that all other parts, including any rotating parts coupled with the output and input shafts 30, 32 have been eliminated for clarity in illustrating the air pressurization system 40.

The transport fluid circuit 46 can further include an air shut-off valve (ASOV) 52, to regulate the intake of ambient air from the exterior 36. The ASOV 52 can be located downstream of the inlet 42 and upstream of the jet pump 44. The transport fluid circuit 46 can fluidly connect the exterior 36 to the jet pump 44 via the ASOV 52. The transport fluid circuit 46 can include a first conduit 54 extending between the inlet 42 and a valve inlet 56 of the ASOV 52. The transport fluid circuit 46 can further include a second conduit 58 extending between a valve outlet 60 of the ASOV 52 and a first jet inlet 62 at the jet pump 44. It is further contemplated that the ASOV 52 can be located at the inlet 42 or proximate the jet pump 44.

A cooling circuit 64 can include the motive fluid conduit 50 along with the sump 48 and jet pump 44, through which the motive fluid 47, by way of non-limiting example a coolant such as a pressurized generator cooling oil, can be recirculated. The motive fluid conduit 50 can extend between a sump outlet 66 at the sump 48 and a second jet inlet 68 at the jet pump 44 to fluidly couple the sump 48 to the jet pump 44. The cooling circuit 64 can pass through at least a portion of the housing 28 to cool the interior 34 and recirculate the motive fluid 47 as a coolant. The motive fluid 47 has a density greater than the ambient air.

Figure 4:
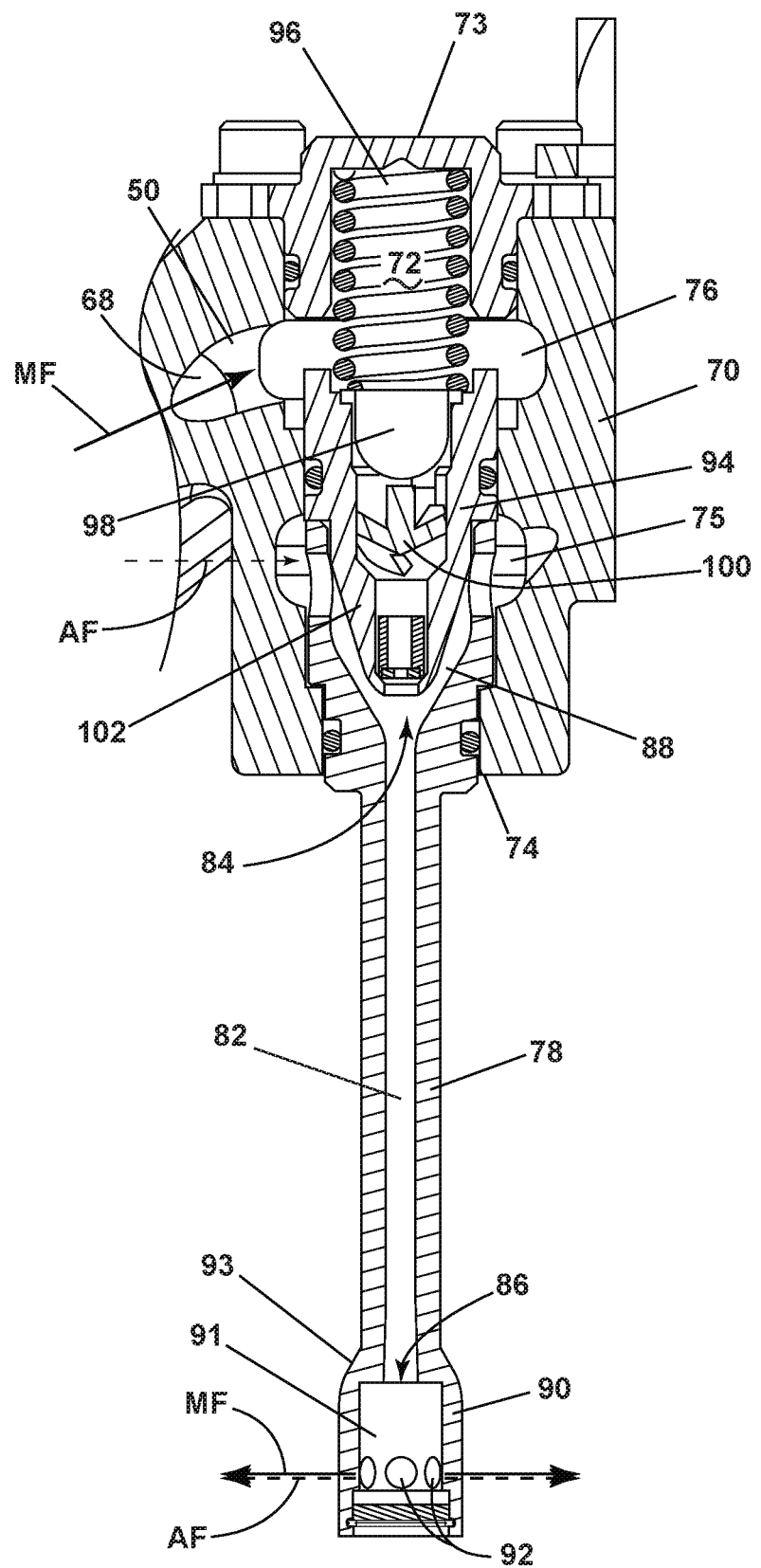
FIG. 4 is a cross-sectional view of the jet pump of FIG. 3 according to an aspect of the disclosure herein.

FIG. 4 is a cross-sectional view of an exemplary jet pump 44 for the air pressurization system 40. An outer housing 70 can define a pump interior 72 and extend between a top portion 73 and a bottom portion 74. At least two inlet cores, a first inlet core 75 and a second inlet core 76, can be formed within the outer housing 70. The at least two inlet cores 75, 76 can be, by way of non-limiting examples, disc shaped and define circular chambers within the pump interior 72.

A shaft 78 defining a hollow interior 80 can extend outwardly from the bottom portion 74. A mixing chamber 82 can be defined by at least a portion of the hollow interior 80. The shaft 78 can extend between a chamber inlet 84 and a chamber outlet 86. The chamber inlet 84 can be defined at least in part by a first nozzle 88, by way of non-limiting example a converging nozzle. The first jet inlet 62 can extend through the outer housing 70 and be fluidly coupled with the mixing chamber 82 via the first converging nozzle 88. The chamber outlet 86 can be defined at least in part by a diffuser 90, by way of non-limiting example a baffle 91. A plurality of holes 92 can be located within the diffuser 90 at the chamber outlet 86. It is further contemplated that the chamber outlet 86 can include a diverging nozzle 93. In an aspect of the disclosure herein the chamber outlet 86 can include both the baffle and diverging nozzle as illustrated, or one or the other.

An inner housing 94 can be located within at least a portion of the pump interior 72. The inner housing 94 can include a jet pump biasing element 96, by way of non-limiting example a compressive spring. The second jet inlet 68 can extend through the outer housing 70 and be fluidly coupled to the pump interior 72 at the second inlet core 76. A filter 98 can be located downstream from the second inlet core 76 in fluid flow line with the motive fluid conduit 50. A swirl inducer 100, by way of non-limiting example a vane or scroll that causes swirling of the motive fluid flow (MF), can be located downstream from the filter 98. The swirl inducer 100 can be in-line with the filter 98 and in fluid flow line with the motive fluid conduit 50. The inner housing 94 can further include an interior nozzle 102, by way of non-limiting example a second converging nozzle located within the first nozzle 88. The interior nozzle 102 can terminate in an interior outlet 104. The interior outlet 104 can be fluidly coupled with the first nozzle 88.

In operation the jet pump 44 can receive an ambient airflow (AF) through the first jet inlet 62. A motive fluid flow (MF) can pass through the second jet inlet 68. The motive fluid flow (MF) can be received within the second inlet core 76, pass through the filter 98 to be filtered, and then move along to the swirl inducer 100 to impel the ambient airflow (AF) as a secondary suction fluid at the first inlet core 75. The motive fluid flow (MF) can be extracted from an existing oil circuit used for cooling and lubrication of bearings, gears, and generator windings. The cooling circuit 64 can have its own oil pump that provides oil flow and pressure.

The motive fluid flow (MF) can be accelerated through the interior nozzle 102 and can exit the interior outlet 104 where it can be received within the converging nozzle 88 ported to the outside atmospheric air. Both the ambient airflow (AF) and the motive fluid flow (MF) move through the hollow interior 80 within the mixing chamber 82 until exiting through the chamber outlet 86. Together the ambient airflow (AF) and the motive fluid flow (MF) can pass through the plurality of holes 92 circumscribing the diffuser 90.

The swirl inducer 100 and the diffuser 90 in particular improve a transfer of momentum from the motive fluid to the ambient air, resulting in greater air flow and pressure head capabilities when compared to a jet pump without these features. In particular, friction between the molecules of the motive fluid flow (MF) and the ambient airflow (AF) results in a transfer of momentum from a high velocity motive fluid flow (MF) to the ambient airflow (AF). The chamber outlet 86 is fluidly coupled with the interior 34 of the housing 28 and consequently the housing 28 becomes pressurized relative the exterior 36. Utilizing cooling oil as the motive fluid 47 is convenient due to availability of the oil and the location of the cooling circuit 64. It is contemplated that other types of motive fluids having a density greater than the ambient air can be used.

Figure 5:
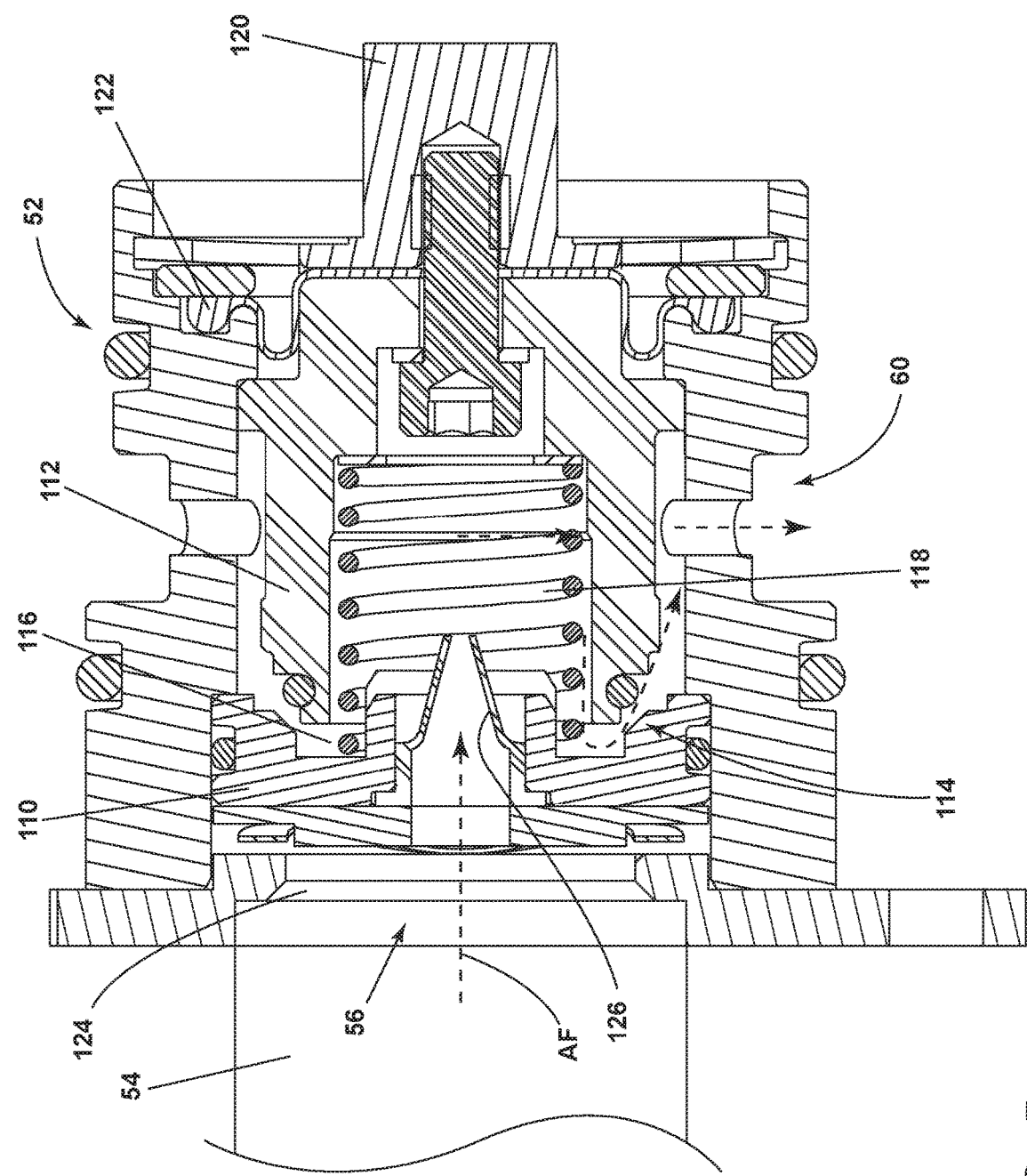
FIG. 5 is a cross-sectional view of the air shut-off valve of FIG. 3 in an opened position.
Figure 7:
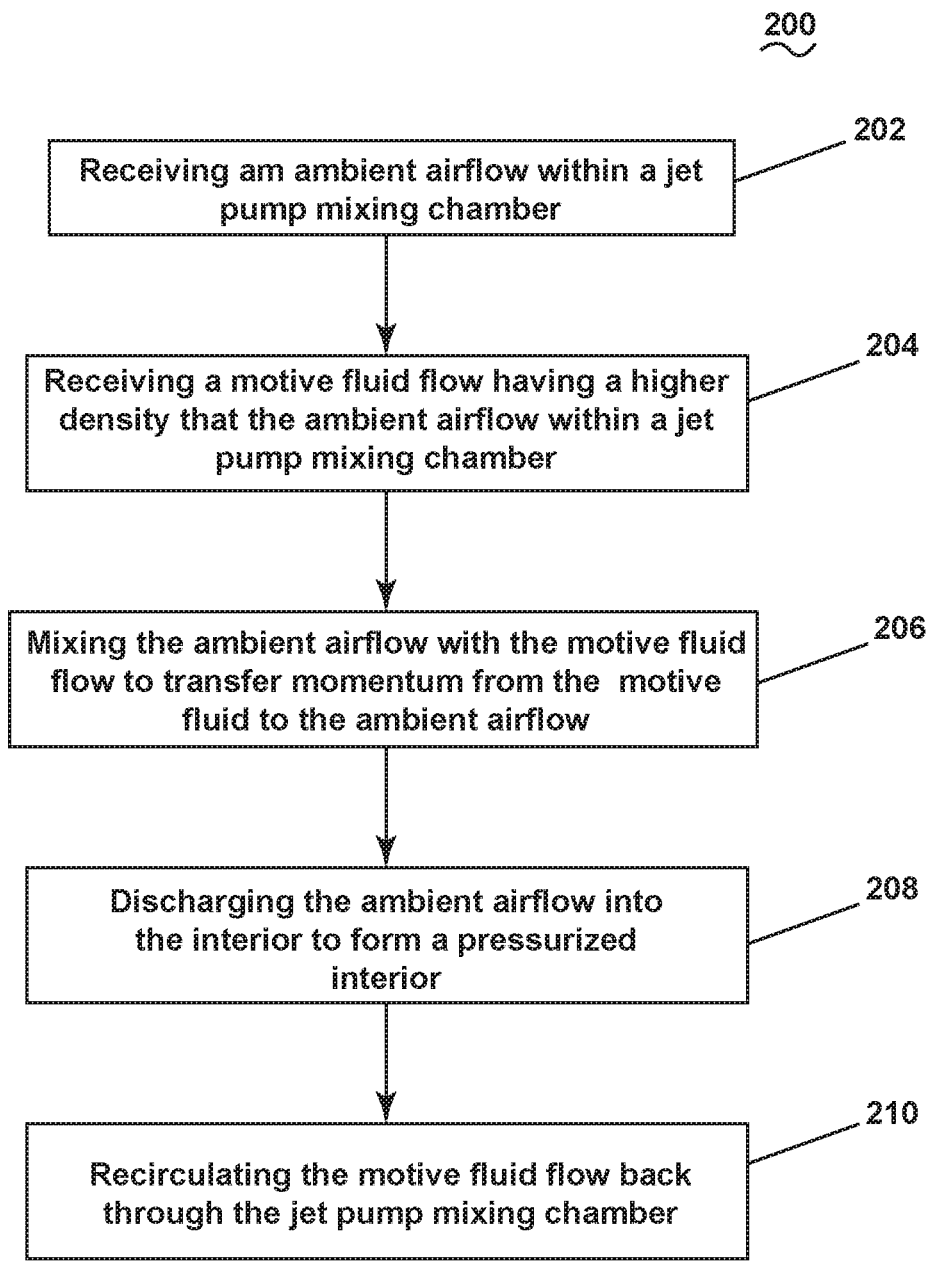
FIG. 7 is a flow diagram for a method for maintaining a predetermined pressure within the housing of FIG. 3.

FIG. 5 is a cross-sectional view of an exemplary ASOV 52 for regulating the amount of ambient air flow (AF) required to pressurize housing 28 to the predetermined pressure (P). The ASOV 52 is fluidly coupled to the first conduit 54 at the valve inlet 56. A valve seat 110 can be located proximate the valve inlet 56. A first check valve 112, by way of non-limiting example a poppet, is movable between an opened position 114 and a closed position 115 (FIG. 7), where the opened position 114 forms a gap 116 between the valve seat 110 and the first check valve 112. A valve biasing element 118, by way of non-limiting example a spring, can be located within the first check valve 112 for moving the first check valve 112 between the opened position 114 and the closed position 115 (FIG. 7). The first check valve 112 can include an inside end 120 extending into the interior 34 of the housing 28 (FIG. 3). A flexible diaphragm 122 provides a movable seal between the interior 34 and the ambient airflow (AF) within the first conduit 54. An inlet air filter 124 can be located at the valve inlet 56 to prevent air contaminates from entering the air pressurization system 40.

A second check valve 126, by way of non-limiting example a duckbill inlet check valve or any type of one-way check valve, is located downstream from the valve inlet 56 to prevent any back flow of the ambient airflow (AF). The second check valve 126 can be opened, as illustrated, when air pressure within the interior 34 of the housing 28 is below the predetermined pressure (P) and closed (FIG. 7) when the interior 34 has reached the predetermined pressure (P).

In operation if the predetermined pressure (P) has not been reached within the interior 34, the ambient airflow (AF) flows through the valve inlet 56 passes around the first check valve 112, through the gap 116, and exits through the valve outlet 60. The valve outlet 60 can be a plurality of holes circumscribing the ASOV 52.

Figure 6:
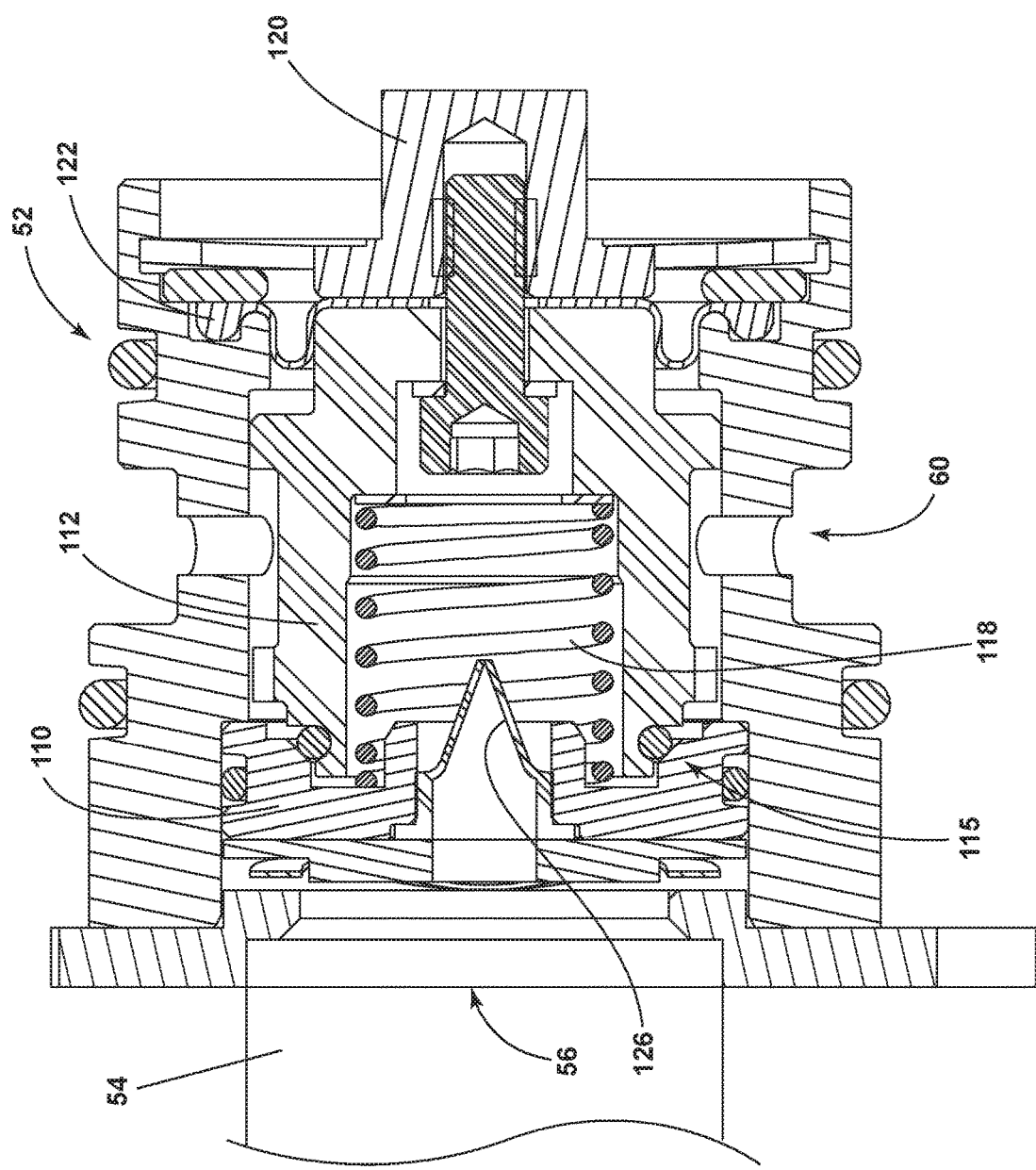
FIG. 6 is a cross-sectional view of the air shut-off valve of FIG. 3 in a closed position.

Turning to FIG. 6, when the predetermined pressure (P) has been reached, the pressure inside the housing 28 acts on the inside end 120 of the ASOV 52 and overcomes a preload force of the biasing element 118, causing the first check valve 112 to seal against the valve seat 110 and close the gap 116 (FIG. 6) providing a fluid connection between the first conduit 54 and the interior 34. When in the closed position 115, the second check valve 126 prevents air leakage back through the valve inlet 56. With the valve inlet 56 closed off, no additional ambient air is pumped into the housing 28 and no additional internal air pressure is generated.

Turning to FIG. 7, a flow chart illustrates a method 200 of maintaining the predetermined pressure (P) within the housing 28 of the generator 10. The method includes at 202 receiving the ambient airflow (AF) within the jet pump mixing chamber 82. At 204 receiving the motive fluid flow (MF) having a higher density than the ambient airflow (AF) within the mixing chamber 82. At 206 mixing the ambient airflow (AF) with the motive fluid flow (MF) to transfer momentum from the motive fluid flow (MF) to the ambient airflow (AF). At 208 discharging the ambient airflow (AF) into the interior (34) to form a pressurized interior. The method 200 can further include discharging the ambient airflow (AF) through the diffuser 90. It is further contemplated that the method 200 also includes receiving the motive fluid flow (MF) through the swirl inducer 100.

Figure 8:
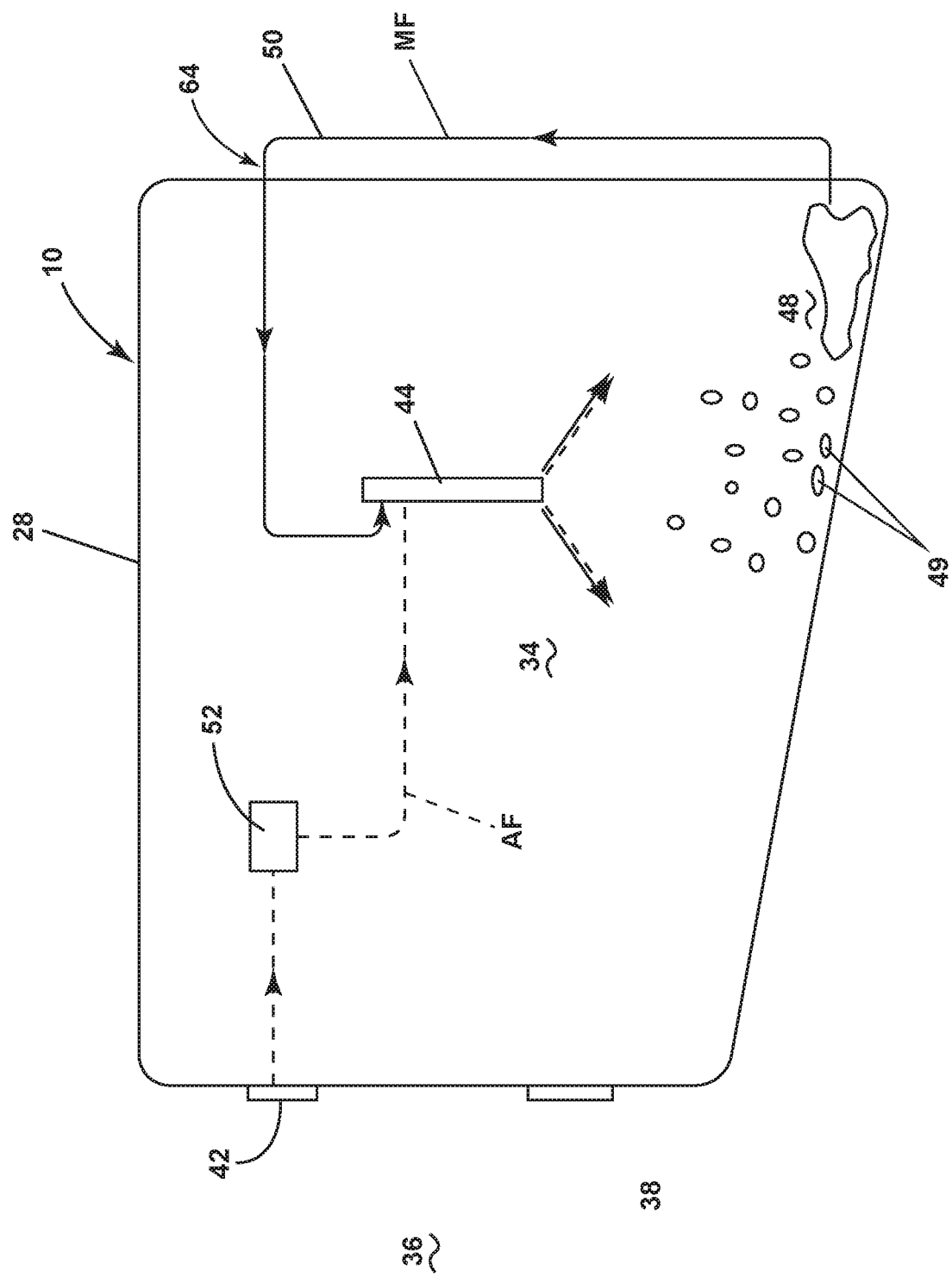
FIG. 8 is the schematic cross-sectional view of the housing from FIG. 3 with arrows representing an ambient airflow and a motive fluid flow within the air pressurization system.

FIG. 8 is the same schematic as FIG. 3, with arrows representing the ambient airflow (AF) and the motive fluid flow (MF). When the ASOV 52 is in the opened position 114 (FIG. 6), the ambient airflow (AF) enters through the inlet 42, passes through the ASOV 52 and is finally received within the jet pump 44. The motive fluid flow (MF) enters the jet pump 44 from the cooling circuit 64. As described herein, the method 200 can further include recirculating the motive fluid flow (MF) back through the jet pump mixing chamber 82 via, by way of non-limiting example, the cooling circuit 64.

After passing through the jet pump 44, motive fluid flow (MF) and ambient airflow (AF) can be discharged into the interior 34 as a mixed flow or pressurized ambient air and motive fluid 47. Due to the higher density of the motive fluid 47 within the motive fluid flow (MF), the motive fluid 47 drops into the sump 48 and collects. The motive fluid conduit 50 is fluidly coupled to the sump 48 forming the complete cooling circuit 64. The method 200 as described herein can further include recirculating the motive fluid flow (MF) through the sump 48.

It should be understood that the generator as described herein and the internal air pressure requirements can be adjusted based on changes in ambient air pressure and any generator internal air leakage rate. The air pressurization system as described herein need only be activated when internal air pressure requires adjustment. The proposed generator air pressurization system has no rotating components.

Typically an air pump is utilized for maintaining a predetermined pressure within a housing as described herein. Air pumps typically have many rotating parts that over time can degrade and require replacement. The air pressurization system described herein eliminates a need for this air pump thus increasing generator reliability, efficiency, and life. Replacing air pump with jet pump and operating the air pressurization system only when is needed, increases generator efficiency that can be appreciated in aircraft fuel saving.

The generator and existing oil cooling systems within require air pressurization to maintain oil system properties while preventing oil pump cavitation, oil aeration, and oil foaming. Furthermore the generator requires air pressurization to prevent any corona discharges within. These issues are more pronounced at high altitudes since ambient air pressure is decreasing with altitude. The air pressurization system as described herein is more reliable at high altitudes due to the use of a motive fluid having a higher density than the ambient air to more efficiently and effectively pressurize the interior of the generator housing.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A generator comprising:
   a housing defining an interior and fluidly separating the interior from surrounding ambient air;
   at least one of a rotor or stator located within the housing;
   a cooling circuit passing through at least a portion of the housing to cool the interior and recirculating a coolant having a density greater than the ambient air;
   a jet pump having a motive fluid conduit fluidly coupled to the cooling circuit, a transport fluid circuit fluidly coupled to the ambient air, and a mixing chamber fluidly connecting the motive fluid conduit and the transport fluid circuit to form a mixed flow within the mixing chamber, with the mixing chamber having a chamber outlet to the interior; and
   an air shut-off valve fluidly coupled to the transport fluid circuit located downstream of the inlet and upstream of the jet pump.

2. The generator of claim 1 wherein the jet pump comprises a nozzle fluidly connecting the transport fluid circuit to the mixing chamber.

3. The generator of claim 2 wherein the nozzle is a converging nozzle.

4. The generator of claim 2 wherein the jet pump further comprises a swirl inducer located in fluid flow line with the motive fluid conduit and upstream of the nozzle.

5. The generator of claim 1 wherein the jet pump further comprises a diffuser located at the chamber outlet.

6. The generator of claim 5 wherein the diffuser is a diverging nozzle.

7. The generator of claim 5 wherein the diffuser is a baffle.

8. The generator of claim 1 wherein the jet pump further comprises a swirl inducer located in fluid flow line with the motive fluid conduit.

9. The generator of claim 1 wherein the jet pump further comprises a filter located in fluid flow line with the motive fluid conduit.

10. The generator of claim 1 wherein the air shut-off valve fluidly connects the transport fluid circuit to the ambient air.

11. The generator of claim 10 wherein the air shut-off valve further comprises a first check valve movable between an opened position and a closed position, where the opened position occurs when an interior pressure is less than a predetermined pressure.

12. The generator of claim 1 wherein the ambient air has a pressure equivalent to atmospheric pressure at an altitude between 9,000 m (30,000 ft) and 22,000 m (70,000 ft).

13. An air pressurization system comprising:
- a housing defining an interior, including a sump for collecting a motive fluid, and fluidly separating the interior from an exterior of surrounding ambient air;
- a transport fluid circuit for transporting an ambient airflow extending between an inlet fluidly coupled to the exterior and an outlet fluidly coupled to the interior;
- a cooling circuit fluidly coupled to the housing at the sump for recirculating the motive fluid;
- a jet pump fluidly coupling the transport fluid circuit and the cooling circuit and comprising a mixing chamber for mixing the motive fluid and the ambient air to produce a pressurized mixture of air and motive fluid that is released into the interior via the outlet; and
- an air shut-off valve fluidly coupled to the transport fluid circuit located downstream of the inlet and upstream of the jet pump.

14. The air pressurization system of claim 13 wherein the jet pump further includes a first jet inlet fluidly coupled with the transport fluid circuit and a second jet inlet fluidly coupled with the cooling circuit.

15. The air pressurization system of claim 14 wherein the first and second jet inlets are fluidly coupled to the mixing chamber at a chamber inlet.

16. The air pressurization system of claim 15 wherein the mixing chamber extends between the chamber inlet and a chamber outlet fluidly coupled with the interior.

17. The air pressurization system of claim 15 further comprising a swirl inducer upstream from the chamber inlet in line with the cooling circuit.

18. The air pressurization system of claim 17 further comprising a filter upstream from the swirl inducer in line with the cooling circuit.

19. The air pressurization system of claim 18 wherein the chamber inlet comprises a first nozzle.

20. The air pressurization system of claim 19 further comprising an interior nozzle in line with the cooling circuit.

21. The air pressurization system of claim 20 where at least one of the first nozzle or the interior nozzle is a converging nozzle.

22. The air pressurization system of claim 21 further comprising a diffuser at the chamber outlet.

23. The air pressurization system of claim 22 wherein the diffuser is at least one of a diverging nozzle or a baffle.

24. The air pressurization system of claim 13 wherein the air shut-off valve further comprises a first check valve movable between an opened position and a closed position, where the opened position occurs when an interior pressure has dropped below a predetermined pressure.

25. A method of maintaining a predetermined pressure within a housing defining an interior and fluidly separating the interior from an ambient air, the method comprising:
- receiving an ambient airflow within a jet pump mixing chamber;
- receiving a motive fluid flow having a higher density than the ambient airflow within the jet pump mixing chamber;
- mixing the ambient airflow with the motive fluid flow to transfer momentum from the motive fluid to the ambient airflow; and
- discharging the ambient airflow into the interior to form a pressurized interior.

26. The method of claim 25 further comprising recirculating the motive fluid flow back through the jet pump mixing chamber.

27. The method of claim 25 further comprising discharging the ambient airflow through a diffuser.

28. The method of claim 25 further comprising swirling the motive fluid flow through a swirl inducer.

29. The method of claim 25 further comprising recirculating the motive fluid flow through a sump.

* * * * *